(12) United States Patent
Abrahamson et al.

(10) Patent No.: US 7,515,385 B1
(45) Date of Patent: Apr. 7, 2009

(54) BAND PIVOT BEARING

(75) Inventors: Scott Abrahamson, Longmont, CO (US); Jerry Coffey, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 583 days.

(21) Appl. No.: 11/088,372

(22) Filed: Mar. 23, 2005

Related U.S. Application Data

(63) Continuation-in-part of application No. 11/051,010, filed on Feb. 4, 2005, now abandoned.

(60) Provisional application No. 60/542,650, filed on Feb. 5, 2004.

(51) Int. Cl.
*G11B 21/08* (2006.01)

(52) U.S. Cl. .................................... 360/264.6

(58) Field of Classification Search ............. 360/264.6, 360/265.2, 264.5, 265.9, 267, 294.7; 720/662
See application file for complete search history.

(56) References Cited

U.S. PATENT DOCUMENTS

| | | | |
|---|---|---|---|
| 5,029,030 A * | 7/1991 | Luecke | .................... 360/264.7 |
| 5,727,882 A | 3/1998 | Butler et al. | |
| 6,018,441 A | 1/2000 | Wu et al. | |
| 6,424,503 B1 * | 7/2002 | Chin et al. | ................ 360/265.2 |
| 6,731,470 B1 | 5/2004 | Oveyssi | |
| 6,963,472 B2 * | 11/2005 | He et al. | ................... 360/265.7 |
| 2002/0049104 A1 * | 4/2002 | Ito | ............................... 474/70 |

* cited by examiner

*Primary Examiner*—Allen T Cao
(74) *Attorney, Agent, or Firm*—Westman, Champlin & Kelly, P.A.; R. Michael Reed

(57) ABSTRACT

A pivot bearing for an actuator assembly of a disk drive includes a first stationary member, a second pivoting member, and a third flexible member interconnecting the first and second members. The first stationary member is secured preferably between the base and top cover of the drive, while the second pivotal member is secured to the actuator. The second pivoting member rotates about the stationary member, and the third flexible member bends in response to the pivoting action of the second member. Rolling contact occurs between bearing surfaces of the first and second members. Overall bearing stiffness is increased with use of the bearing, and particularly radial stiffness. Increased bearing stiffness enhances system mode frequency and thereby improves bandwidth capability for a disk drive.

20 Claims, 5 Drawing Sheets

BAND PIVOT BEARING

CROSS REFERENCE TO RELATED APPLICATION

This application claims priority from U.S. provisional application entitled "Band Pivot Bearing," filed on Feb. 5, 2004 and having Ser. No. 60/542,650, and is a continuation-in-part application of application Ser. No. 11/051,010 filed Feb. 4, 2005 now abandoned.

FIELD OF THE INVENTION

The present invention relates to disk drives, and more particularly, to pivot bearings used to mount a rotary actuator used in the disk drive.

BACKGROUND OF THE INVENTION

Disk drives generally utilize rotary actuators to position one or more magnetic read/write heads (also known as transducers), with respect to a similar number of magnetic disks rotatably mounted on a hub driven by a motor. The read/write heads are moved along selected tracks of the magnetic disks to gain access to the digital information record on that track and/or to write data to particular locations on the tracks. The read/write heads are mounted on an air bearing slider. The slider positions the read/write heads above the data surface of the disks by a cushion of air generated by the rotating disk. Alternatively, the slider may operate in contact with the surface of the disk. The slider is mounted to a suspension load beam or suspension arm assembly. The suspension maintains the read/write heads and the slider adjacent to or in contact with the data surface of the disk and preferably with as low a loading force as possible.

The suspension arm is connected to the distal end of a rotary actuator arm that is pivotally installed within the housing of the disk drive. Typically, the actuator arm is mounted by a pivot bearing assembly which allows the actuator arm to pivot in response to torques generated by a voice coil motor mounted to the yoke portion of the actuator arm.

Ideally, the pivot bearing assembly provides a nearly frictionless pivot for the actuator thereby allowing the actuator to be precisely controlled for movement across the surface of the disk. It is desirable that the pivot bearing assembly have a high radial and axial stiffness, yet maintain a very low rotational stiffness thereby ensuring the actuator has adequate track following capabilities. As track densities increase to meet higher product capacities, improved dynamic performance of the actuator is required in order to increase the bandwidth of the servo loop. Drive servo performance is largely determined by servo bandwidth, which is dictated by the dynamic performance of the actuator. The most prominent bandwidth limiting characteristic in a disk drive is typically the system mode of the actuator which inherently has some amount of uncontrollable vibration. Increasing a pivot bearing assembly's radial stiffness increases system mode frequency and thereby improves the bandwidth capability of the disk drive.

A conventional pivot bearing assembly typically includes a central pin or shaft, one or more inner races, corresponding outer races, wherein the races coaxially surround the shaft. Ball bearings are located between the races and are sealed with respect to the races. With such conventional bearings, the radial stiffness of the bearings is derived from radial contact forces between the ball bearings and the races. As well understood by those skilled in the art, in order for a conventional bearing to function with low rotational resistance, the ball bearings cannot be tightly jammed against the race surfaces, and rather, there must be some defined gap between the ball bearings and races which allow at least some rotation of the ball bearings in the races in order to provide minimal frictional interference for rotation of an outer race about an inner race. Thus, some amount of looseness or "play" exists for such conventional bearings. As such, from a design standpoint, the need for low rotational resistance is in conflict with the need for high radial stiffness.

There are three conventional approaches to assembling the pivot assembly to the actuator body. One approach is to use a screw to pull or push the pivot assembly against the actuator bore. Another approach is to bond the pivot assembly to the actuator bore. Yet another approach is to conduct a press fit with an interposing device such as a tolerance ring. Each approach offers advantages and disadvantages. The screw attach bearing is easy to rework but has low stiffness. The bonded approach has high stiffness but is nearly impossible to rework. The press fit between the bearing and the bore of the actuator can create particulate contamination due to scoring and scraping of the outer race against the bore which inherently occurs when the bearing is press fit and reverse pressed during removal.

Based upon the shortcomings of the prior art, there is a need for a pivot bearing that is of simple construction, yet can accommodate increased drive performance requirements by increasing overall stiffness of the bearing, and particularly radial stiffness of the bearing. Additionally, there is a need to provide a bearing construction which accommodates rework by minimizing contamination. It is also preferable to design a pivot bearing that requires a minimal amount of torque to rotate the actuator. Therefore, it is not desirable to sacrifice the advantages of a nearly frictionless bearing by increasing overall bearing stiffness with increased bearing friction.

SUMMARY OF THE INVENTION

In accordance with the present invention, a pivot bearing is provided which results in an increase in overall bearing stiffness, particularly radial stiffness. Yet, the bearing maintains its rotational capability without an increased amount of torque required for rotation.

In a preferred embodiment, the bearing includes two bearing shafts or members that are connected to one another by a preloaded connection band. One of the shafts is fixed to the base of the disk drive, and the other shaft rotates about the fixed shaft. The moving or rotatable shaft is attached to the actuator. The rotatable shaft rolls against the fixed shaft to create the rotational bearing movement. As the rotatable shaft rolls against the fixed shaft, the connection band also rotates so that the shafts remain in rolling contact. Throughout the arc or range of rotation, the relative distance between the axes of the shafts remains constant, so the connecting band does not stretch or contract during rotation, therefore maintaining the same rotational characteristics in terms of resistance to rotation. The curvatures of the shafts can be adjusted to limit or increase the overall rotational range of the bearing. In the preferred embodiment, the shafts have curvatures that provide the necessary sweep angle for rotation of the actuator from the landing zone on a disk to the peripheral edge of the disk. The curvatures of the shafts, the radii of the connection band attachment points, the band preload, and the surface contact areas of the shafts all affect the performance of the bearing. The optimal curvature of the shafts is largely determined by the required sweep angle, but is also influenced by the effective pivot location desired, and the overall required diameter of the bearing. For example, a larger required sweep angle may dictate a greater degree of curvature incorporated on the shafts. Also, the overall effective diameter of the bearing is preferably one which matches a standard bore size for an actuator. Thus, no additional modifications are required for the actuator to accept the bearing of the present invention.

The torque required to rotate the rotatable shaft is an amount of force to overcome the rolling friction of the contact surfaces of the shafts, the rolling friction of the connecting band against the bearing surfaces, and the "memory" or torsional resistance of the connection band as it is bent during rotation of the shafts. As compared to traditional bearings, required torque is not increased in the present invention. The radial stiffness of the present invention is increased because of the relatively large bearing surfaces which maintain contact throughout all points of rotation. The axial stiffness of the bearing is determined by the sheer stiffness of the connection bands, which are a function of the geometry of the band in terms of width and thickness, the preload in the bands, and the material characteristics of the band determined by selecting a metal with a relatively high sheer stiffness.

Various embodiments of the invention may be summarized as follows:

1. A pivot bearing especially adapted for use in pivoting an actuator of a disk drive, said bearing comprising:
a first stationary member secured to said disk drive;
a second pivotal member pivotally attached to said first stationary member and secured to the actuator, said second member being pivotable about said first stationary member by rolling contact of a bearing surface of said first member against a corresponding bearing surface of said second member; and
a band interconnecting said first and second members along said bearing surfaces thereof.

2. A pivot bearing, as in paragraph number 1, wherein:
said first stationary member further includes an outer surface, said bearing surface of said first stationary member having a first curvature, and said outer surface having a second opposite curvature.

3. A pivot bearing, as in paragraph number 1, wherein:
said second pivotal member further includes an outer surface, said bearing surface of said second stationary member having a first curvature, and said outer surface having a second opposite curvature.

4. A pivot bearing, as in paragraph number 1, wherein:
said bearing surfaces of said first and second members maintain rolling contact with one another throughout a full range of rotation of said pivotal member about said stationary member.

5. A pivot bearing, as in paragraph number 1, wherein:
said band further includes a central portion secured to said first stationary member, and at least a pair of legs extending from said first stationary member and connected to said second pivotal member.

6. A pivot bearing, as in paragraph number 5, wherein:
said band further includes a third leg extending from said first stationary member and connected to said second pivotal member.

7. A pivot bearing, as in paragraph number 1, wherein:
said band is constructed of a substantially planar sheet of material and formed in a desired shape enabling interconnection of said first and second members.

8. A pivot bearing, as in paragraph number 1, wherein:
said first and second members each include a recessed middle section for delimiting attachment of said band therebetween.

9. A pivot bearing, as in paragraph number 1, wherein:
said band includes a plurality of independent bands interconnecting said first and second members.

10. A pivot bearing especially adapted for use in pivoting an actuator of a disk drive, said bearing comprising:
a first stationary member secured to said disk drive;
a second pivotal member pivotally attached to said first stationary member and secured to the actuator, said second member being pivotable about said first stationary member by rolling contact of a bearing surface of said first member against a bearing surface of said second member; and
means for interconnecting said first and second members, said means for interconnecting having a first end that remains fixed to said first stationary member, and a second end that attaches to said second pivotal member and simultaneously pivots with said second pivoting member.

11. A pivot bearing, as in paragraph number 10, wherein:
said first stationary member further includes an outer surface, said bearing surface of said first stationary member having a first curvature, and said outer surface having a second opposite curvature.

12. A pivot bearing, as in paragraph number 10, wherein:
said second pivotal member further includes an outer surface, said bearing surface of said second stationary member having a first curvature, and said outer surface having a second opposite curvature.

13. A pivot bearing, as in paragraph number 10, wherein:
said bearing surfaces of said first and second members maintain rolling contact with one another throughout a full range of rotation of said pivotal member about said stationary member.

14. A pivot bearing, as in paragraph number 10, wherein:
said means for interconnecting further includes a central portion secured to said first stationary member, and a pair of legs extending from said first stationary member and interconnecting said first stationary member to said second pivotal member.

15. A pivot bearing member, as in paragraph number 14, wherein:
said means for interconnecting further includes a third leg interconnecting said first stationary member and said second pivotal member.

16. A pivot bearing member, as in paragraph number 10, wherein:
said means for interconnecting is constructed of a substantially planar sheet of material and formed in a desired shape enabling interconnection of said first and second members.

17. A pivot bearing, as in paragraph number 10, wherein:
said band includes a plurality of independent bands interconnecting said first and second members.

18. An actuator assembly especially adapted for a disk drive, said actuator assembly comprising:
an actuator body including a central block portion, at least one actuator arm extending from said block portion, a yoke connected to said block portion and extending away from said block portion in a direction substantially opposite to the at least one actuator arm, and a central bore formed through said block portion;
a suspension attached to a distal end of said at least one actuator arm;
at least one transducer attached to said suspension;
a voice coil mounted to said yoke;
a pivot bearing positioned in said bore of said block portion, said pivot bearing including:
a first stationary member secured to said disk drive;
a second pivoting member pivotally attached to said first stationary member and secured to the actuator, said second member being pivotable about said first stationary member by rolling contact of a bearing surface of said first member against a bearing surface of said second member; and a band interconnecting said first and second members along said bearing surfaces thereof.

19. A method of actuating an actuator assembly in a disk drive, said method comprising the steps of:

(i) providing an actuator assembly including:

an actuator body having a central block portion, at least one actuator arm extending from said block portion, a yoke connected to said block portion and extending away from said block portion in a direction substantially opposite to the at least one actuator arm, and a central bore formed through said block portion;

a suspension attached to a distal end of said at least one actuator arm;

at least one transducer attached to said suspension;

a voice coil mounted to said yoke;

a pivot bearing positioned in said bore of said block portion, said pivot bearing including a first stationary member secured to said disk drive, a second pivoting member pivotally attached to said first stationary member and secured to the actuator, said second member being pivotable about said first stationary member by rolling contact of a bearing surface of said first member against a bearing surface of said second member, and a band interconnecting said first and second members along said bearing surfaces thereof;

(ii) applying an electrical current through the voice coil resulting in a torque being applied to said actuator assembly; and (iii) rotating said second pivotal member about said first stationary member in response to said torque, said bearing surface of said first stationary member maintaining contact with said bearing surface of said second pivotal member, and said band being simultaneously deflected in response to said rotation of said second pivoting member about said first stationary member.

20. A method of actuating an actuator assembly in a disk drive, said method comprising the steps of:

providing a disk drive including an actuator assembly pivotally mounted therein by a pivot bearing, said pivot bearing having a first stationary member secured to the disk drive, a second pivotal member secured to the actuator assembly, and a band interconnecting the first and second members;

applying an electrical current through a voice coil attached to said actuator assembly, said current causing a torque to be applied to said actuator assembly; and rotating said second pivotal member about said first stationary member in response to said torque, said first stationary member having a bearing surface maintaining rolling contact with a bearing surface of said second pivotal member, and said band being simultaneously deflected in response to said rotation of said second pivoting member.

21. A method as in paragraph number 20, wherein:

said bearing surface of said first stationary member has a first curvature, and said bearing surface of said second pivotal member has a second opposing curvature enabling said actuator assembly to be pivoted along a desired sweep angle.

22. A method as in paragraph number 20, wherein:

said band is constructed of a substantially planar sheet of material and formed in a desired shape enabling interconnection of said first and second members.

23. A pivot bearing especially adapted for use in pivoting an actuator of a disk drive, said bearing comprising:

a first stationary member secured to said disk drive;

a second pivotal member pivotally attached to said first stationary member and secured to the actuator, said second member being pivotable about said first stationary member by rolling contact of a bearing surface of said first member against a corresponding bearing surface of said second member;

a third flexible member interconnecting said first and second members, said third flexible member deflecting simultaneously in response to rolling contact of said bearing surfaces against one another, said third flexible member being arranged to cause said first and second members to maintain contact with one another throughout at least a required sweep angle of the actuator.

24. A pivot bearing, as in paragraph number 23, wherein:

said third flexible member further includes a central portion secured to said first stationary member, and at least a pair of legs extending from said first stationary member and connected to said second pivotal member.

25. A pivot bearing, as in paragraph number 23, wherein:

said third flexible member is constructed of a substantially planar piece of material and formed in a desired shape enabling said third flexible member to bend in response to said second member pivoting about said first member.

26. A pivot bearing, as in paragraph number 23, wherein:

said third flexible member is prestressed prior to being connected to said first and second members to establish primary radial and axial stiffness for said bearing and to establish minimum stiffness under working and shock loads.

27. A pivot bearing, as in paragraph number 23, wherein:

said first and second members each include a recessed middle section for delimiting attachment of said third flexible member therebetween.

28. A pivot bearing, as in paragraph number 23, wherein:

said third flexible member includes a plurality of flexible members interconnecting said first and second members.

Additional features and advantages of the invention will become apparent from a review of the drawings, taken in conjunction with the following detailed description.

DETAILED DESCRIPTION OF THE DRAWINGS

Figure 1:
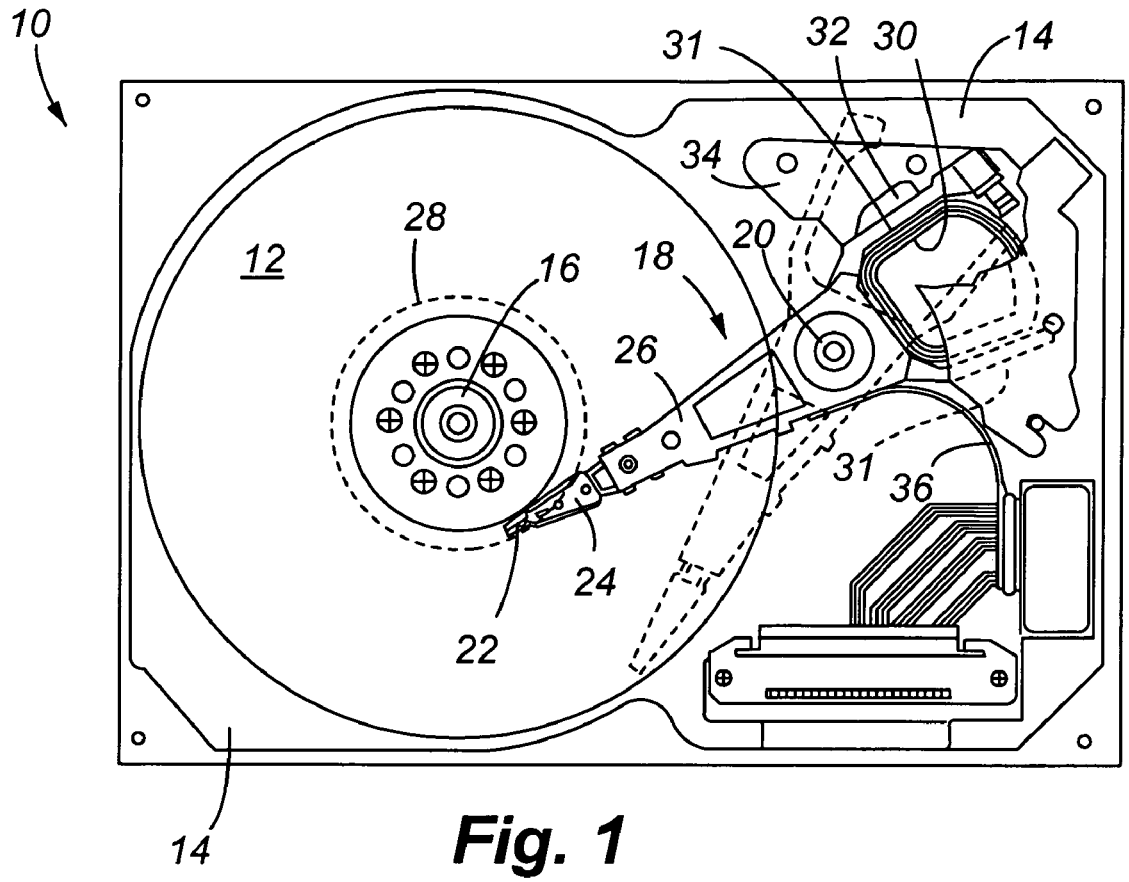
FIG. 1 is a simplified plan view of a prior art disk drive.

FIG. 1 shows a plan view of a disk drive assembly 10, with the top cover removed. FIG. 1 is representative of any number of common disk drives. The disk drive assembly as illustrated includes at least one disk 12, typically having magnetic media both on the upper and lower surfaces thereof. The disk 12 along with other components of the disk drive are contained within the housing 14. The disk 12 is mounted over a hub 16 which is driven by a motor (not shown) enabling the disk to rotate at high revolutions per minute during operation. An actuator assembly 18 is shown rotatably mounted to an actuator pivot bearing 20. Basic components of the actuator assembly 18 are shown as including one or more read/write heads 22 mounted on a flexure arm or suspension arm assembly 24. Suspension arm 24, in turn, is attached to actuator arm 26. The actuator assembly 18 is shown parked over the landing zone. The landing zone has been represented by the area of the disk 12 on or adjacent disk track 28. The landing area of the disk is allocated for take off and landing of the read/write heads 22 during spin-up and spin-down of the disk. The actuator assembly 18 is rotated to a desired disk track by a voice coil motor shown as voice coil 30. The voice coil 30 is typically mounted between the yokes 31 of the actuator assembly. The voice coil 30 is immersed in a magnetic field generated by magnet 32. An actuator control circuit causes current flow in the voice coil motor 30, and ultimately controls the position of the actuator assembly 18 by varying current through the voice coil. Magnet 32 is mounted to a mounting plate 34. FIG. 1 illustrates other common elements of a disk drive including a communications bus 36 that transfers electronic signals to and from the read/write heads 22.

Figure 2:
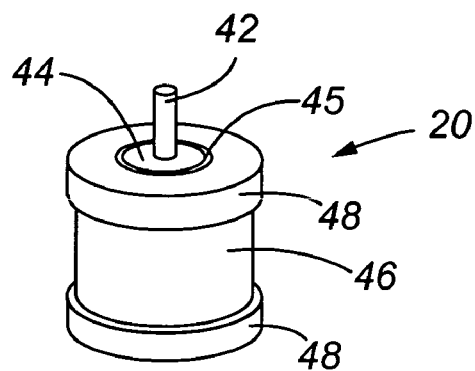
FIG. 2 is an enlarged perspective view of a prior art pivot bearing.

Now referring to FIG. 2, a prior art pivot bearing 20 is illustrated. Typically, a pivot bearing includes a stationary mounting shaft 42 that has its upper end fixed to the top cover, and its lower end fixed to the base of the housing 14. The prior art bearing further includes one or more inner races 44 which remain fixed to the mounting shaft 42, and corresponding outer races 46 which surround the inner races 44. A plurality of ball bearings (not shown) are positioned between the inner and outer races thereby allowing the outer race to rotate about the inner race. Seals 45 are provided between the inner and outer races. Optionally, the bearing may include one or more outer flanges 48 which accommodate the particular configuration of the actuator bore which receives the bearing.

Figure 3:
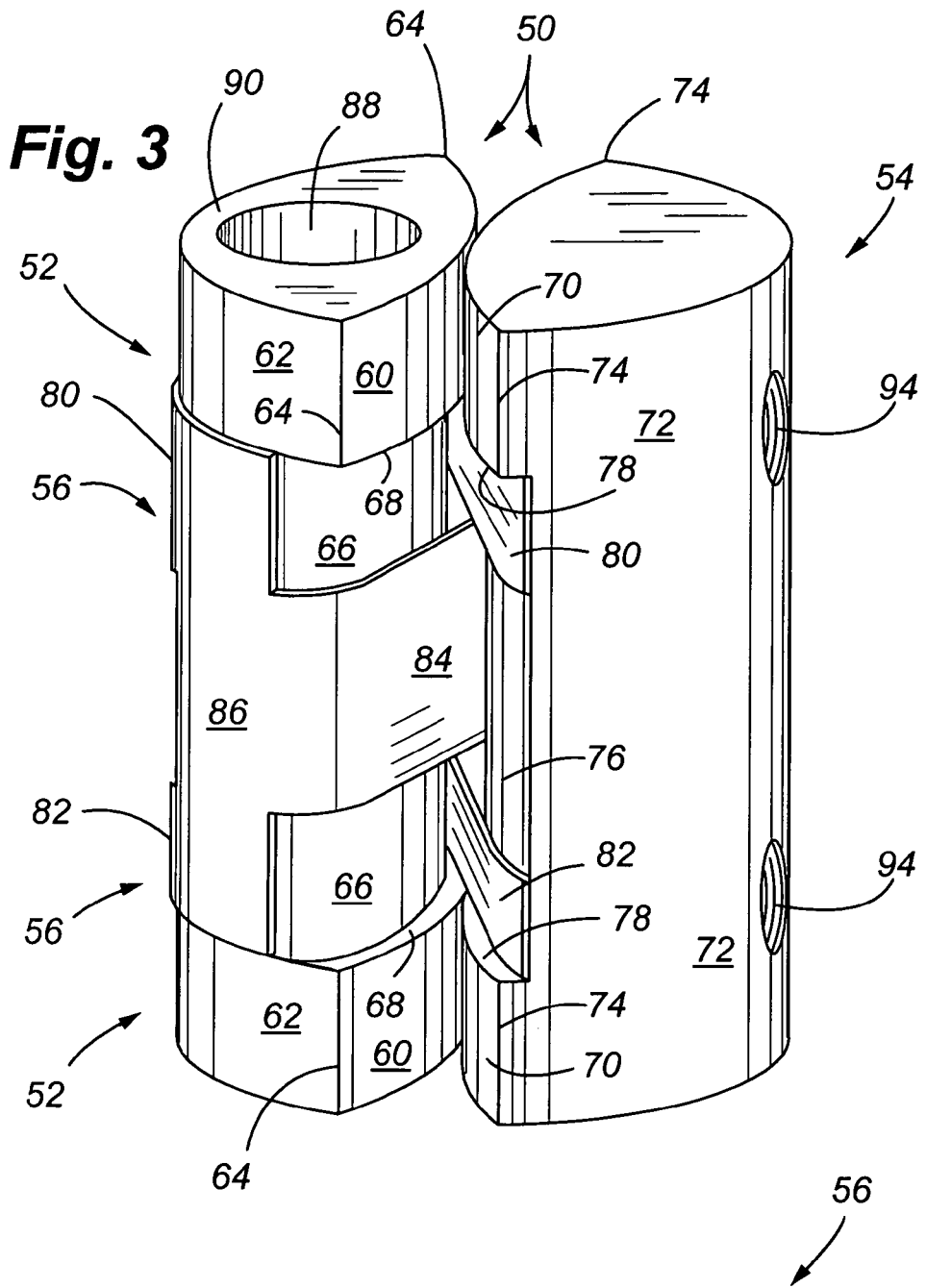
FIG. 3 is an enlarged perspective view of the pivot bearing of the present invention.

FIG. 3 illustrates the pivot bearing 50 of the present invention. The bearing 50 includes a fixed shaft or member 52, and a rotatable shaft or member 54. A connection band or strap 56 interconnects the shafts 52 and 54. The inner bearing or contact surfaces of the shafts are shown as surface 60 on shaft 52 and surface 70 on shaft 54. The surfaces 60 and 70 are curved, and the particular curvature of the surfaces 60 and 70 are one factor in determining the sweep angle of the actuator when the bearing is installed. The outer surfaces of the bearing are shown as surface 62 for shaft 52 and surface 72 for shaft 54. The outer surfaces 62 and 72 are also curved, but maintain a curvature opposite of their corresponding inner surfaces 60 and 70. Accordingly, the shafts 52 and 54 have a generally "football" shaped cross-section. The inner surface 60 and outer surface 62 of the shaft 52 intersect with one another along edges 64. The inner surface 70 and outer surface 72 of shaft 54 are shown as intersecting along edges 74. Both the fixed and rotatable shafts may include an interior or middle section 66 and 76, respectively, which accommodate attachment of the band 56. As shown, these middle sections 66 and 76 represent areas along the shafts that form a groove or undercut as compared to the most upper and lower ends of the shafts. The depth of the undercut or groove areas formed by the middle sections 66 and 76 are shown by flanges/ledges 68 and 78.

Figure 4:
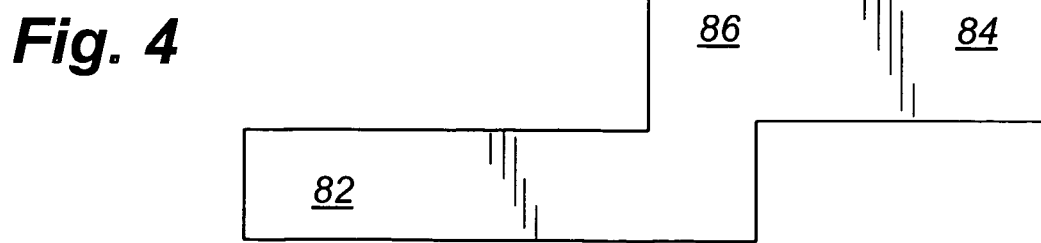
FIG. 4 is a plan view of the connecting band used to interconnect the shafts of the bearing.

Referring also to FIG. 4, the band 56 is shown in the preferred configuration wherein the band includes a first leg or extension 80, a second leg or extension 82, and a middle or third leg or extension 84. A central portion or area 86 lies between the extensions. The band 56 is wrapped around the stationary member 52 as shown, and the respective free ends of each of the extensions 80, 82 and 84 are then connected to the rotatable shaft 54. The band 56 is attached to the fixed shaft 52 as by welding the center area 86 to the middle section 66. Each of the extensions 80, 82 and 84 are also preferably attached to the rotatable shaft 54 as by welding the extensions to the middle section 76. However, the size of the welds are limited so that the rotatable shaft may rotate about the fixed shaft without the welds interfering with the movement of the band extensions. In other words, the welds are sized and positioned so that the welds do not result in an increased amount of torque required to rotate the rotatable shaft about the fixed shaft.

The particular shape of the band 56 is shown as including the three extensions. However, it shall be understood that this is but one configuration that may be employed for providing a flexible band which may interconnect the shafts, and accommodate the required rotational capability of the bearing. Therefore, it is contemplated within the present invention that the band 56 could simply be a rectangular shaped member which interconnects the shafts, or the band 56 may have some composite shape with two or more extensions that best accommodate design specifications, or multiple individual bands that are independently joined to the shafts during the manufacturing process The band 56 is preloaded or prestressed to ensure that the shafts remain in contact under all operating conditions and create a high radial stiffness. Prestressing/preloading can be achieved by loading the bands in tension and holding the load while attaching the bands to the shafts. The preloading/prestressing of the bands also creates a stiff structure that resists axial displacements and undesired moments or rotations between the shafts.

As also seen in FIG. 3, the fixed shaft 52 has an opening 88 formed on the upper surface 90 thereof. As discussed further below, opening 88 receives a mounting pin or screw for securing the upper end of the shaft 52 to the top cover of the disk drive. The lower surface of the fixed shaft 52 also has an opening (not shown) formed therein to receive a mounting pin or screw which secures the lower end of the fixed shaft 52 to the base of the disk drive.

Figure 5:
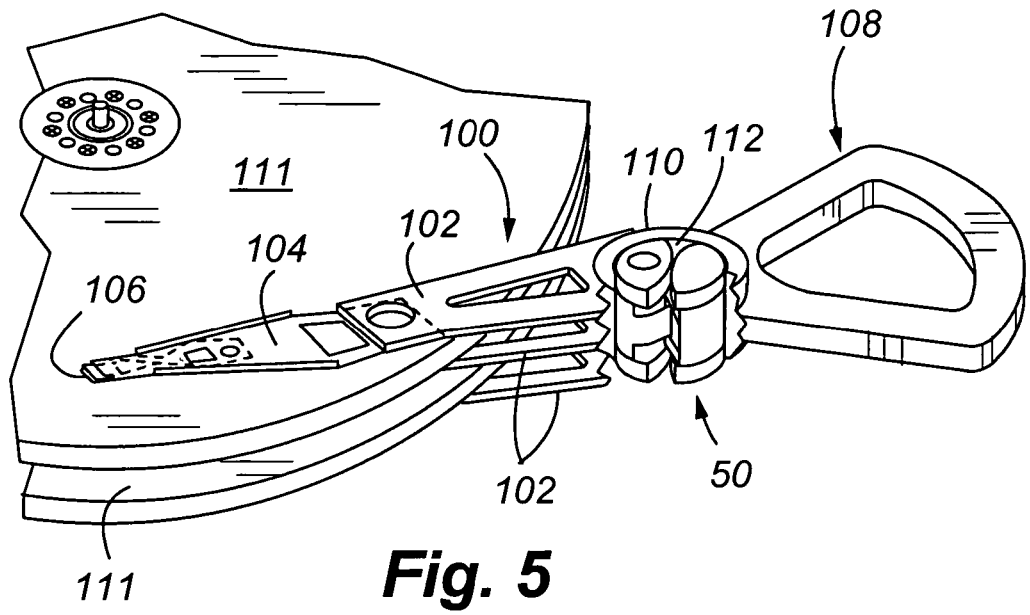
FIG. 5 is a fragmentary perspective view showing the pivot bearing of the present invention installed in a standard actuator.

FIG. 5 illustrates the bearing 50 installed within the bore 112 formed in the bearing housing 110 of a standard actuator assembly 100. As with the prior art actuator shown in FIG. 1, the actuator 100 in FIG. 5 simply represents another standard actuator assembly which may include one or more transducers or read/write heads 106, a suspension 104, an actuator arm 102, and a voice coil 108. In the particular example shown in FIG. 5, the actuator assembly includes a plurality of actuator arms which therefore allow read/write operations with respect to media located on both sides of multiple disks 111 within the disk pack.

Figure 6:
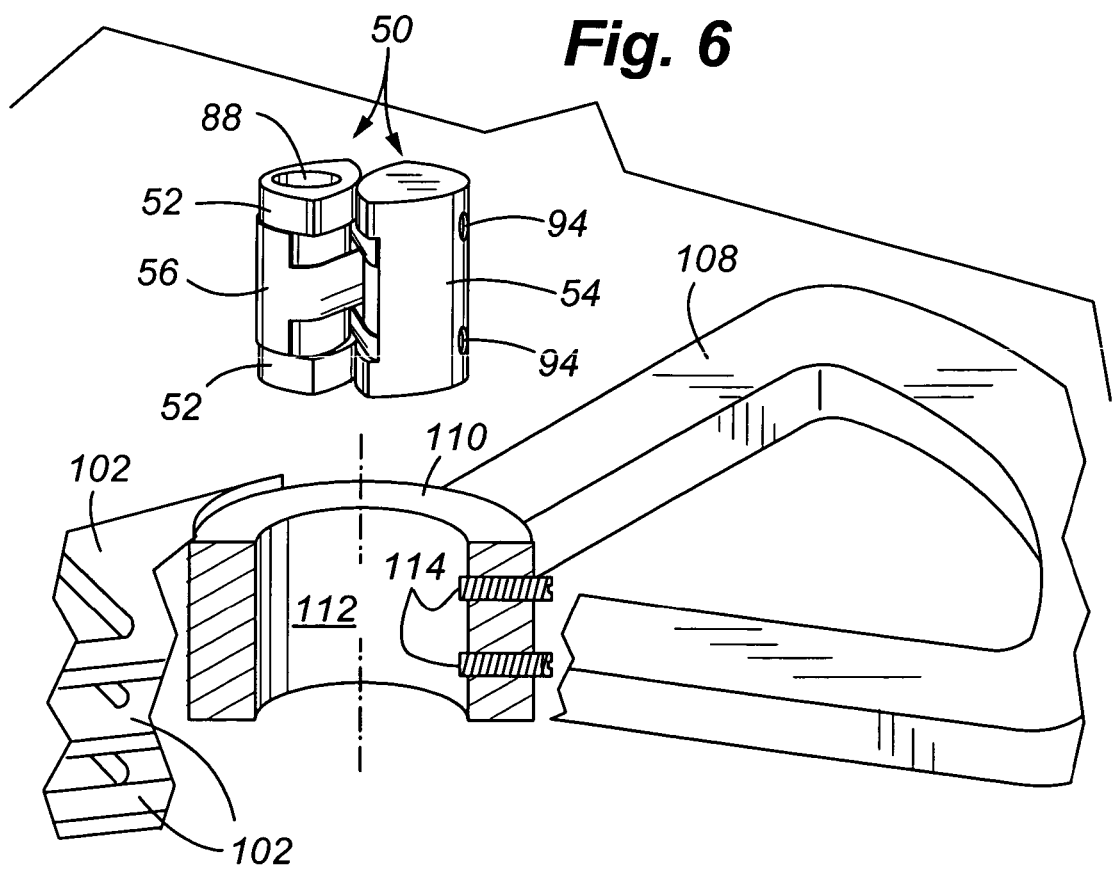
FIG. 6 is an enlarged exploded fragmentary perspective view of the pivot bearing and actuator of FIG. 5.

Referring also to FIG. 6, it is shown that the bearing 50 is installed in an upright configuration, and the bearing is sized to fit within the bore 112. One way in which the movable shaft 54 may be secured to the actuator assembly is by use of one or more fasteners 114 that extend through the bearing housing or block portion 110 of the actuator assembly. The fasteners 114 protrude through and beyond the bore 112, and are threaded into openings 94 spaced along the outer surface 72 of the rotatable shaft 54. In order to reduce potential contamination, it may be desirable to size the shafts 52 and 54 such that they substantially fill the bore opening 112, but do not make scraping contact against the bore 112. Thus during assembly and rework, scraping contact of the pivot bearing against the bore may be substantially eliminated.

Figure 7:
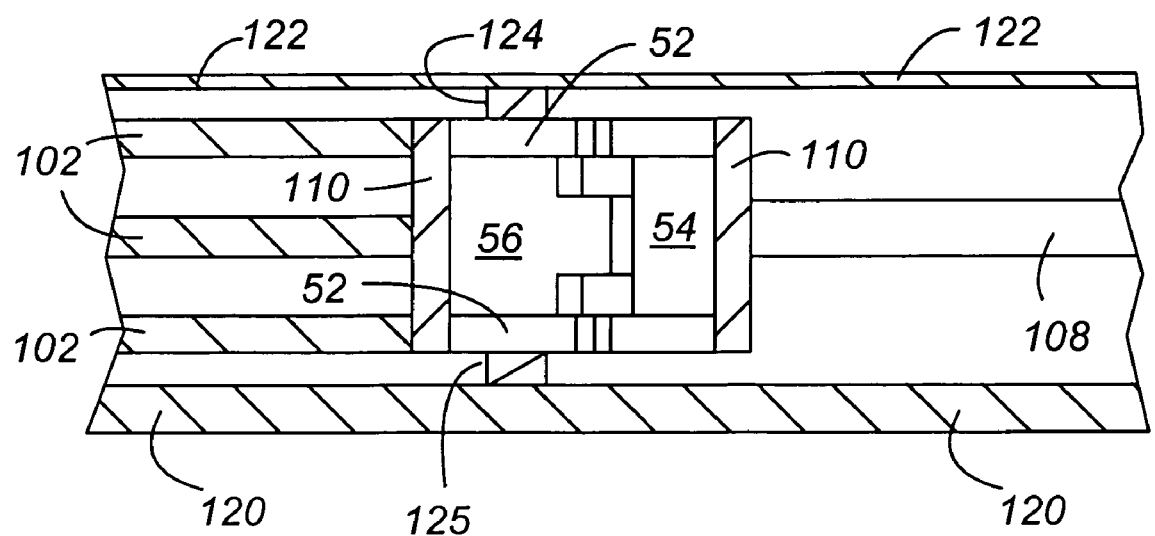
FIG. 7 is a vertical section of the pivot bearing installed in the actuator of FIG. 5.

Now referring to FIG. 7, the cross-section there shows the pivot bearing 50 installed within a disk drive. A mounting pin 124 is shown securing the upper end of the fixed shaft 52 to the top cover 122. Similarly, a lower pin 125 is shown for securing the lower end of the fixed shaft 52 to the base 120 of the disk drive.

Figure 8:
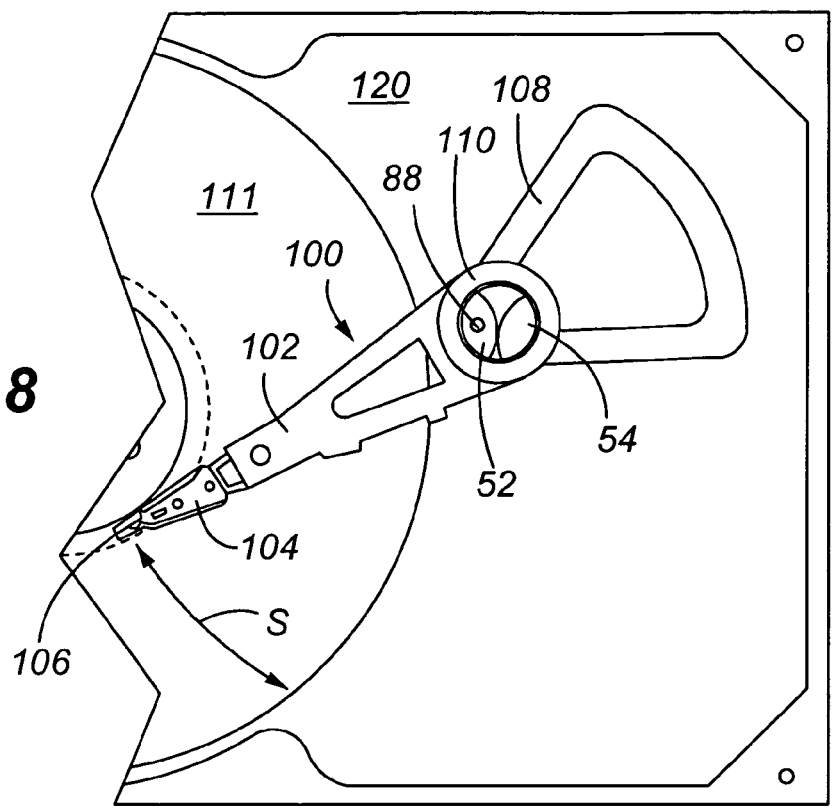
FIG. 8 is a plan view illustrating the pivot bearing installed in the actuator and the actuator positioned over the landing zone of the disk.
Figure 9:
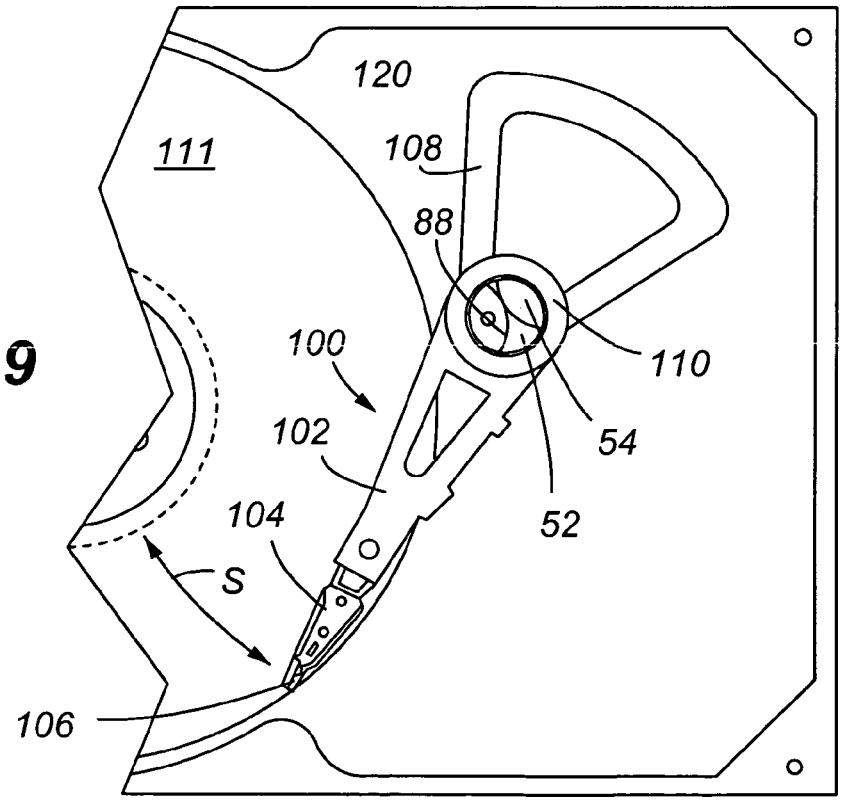
FIG. 9 is another plan view illustrating the actuator being pivoted to the peripheral edge of the disk.

FIG. 8 illustrates a plan view of the disk drive with the top cover removed. The actuator assembly 100 is positioned so that the read/write heads 106 are placed over/adjacent the landing zone. FIG. 9 illustrates the actuator assembly 100 rotated so that the read/write heads 106 are located along a particular disk track adjacent the peripheral edge of the disk. Thus, FIGS. 8 and 9 show the manner in which the inner surface 70 of the movable shaft 54 rolls against the inner surface 60 of the fixed shaft. The particular curvature shown for the surfaces 60 and 70 easily accommodate the necessary sweep angle S for the actuator 100.

Because rolling contact is maintained between the bearing surfaces of the shafts throughout all points of rotation of the sweep angle, there is no "play" or separation between the bearing elements thereby greatly increasing radial stiffness of the bearing. As mentioned above, with use of a standard pivot bearing, since there are small gaps between the races and the ball bearings, there is an inherent amount of play or looseness in the standard pivot bearing which therefore limits the dynamic response of the actuator assembly. Enhanced radial stiffness of the present invention however is not achieved at the expense of a loss in overall bearing stiffness to include axial stiffness. Although the band 56 may provide nearly momentless rotation between the shafts, the band 56 maintains high stiffness in the axial direction so that the flight characteristics of the read/write heads are not altered by increased axial play in the bearing.

The foregoing invention has been described with particular detail in reference to the preferred embodiment; however, various changes and modifications may be made to the invention that fall within the scope of the claims appended hereto.

We claim:

1. A storage device comprising:
   a fixed member including a first bearing surface comprising a first upper bearing surface and a first lower bearing surface separated by a first recessed portion and including an outer surface;
   a rotatable member extending parallel to the fixed member and adapted to rotate about the fixed member, the rotatable member including a second bearing surface comprising a second upper bearing surface and a second lower bearing surface separated by a second recessed portion; and
   a band coupled to the fixed member and connected in tension to the second recessed portion to secure the first upper and lower bearing surfaces into contacting engagement with the second upper and lower bearing surfaces.

2. The storage device of claim 1, wherein the band creates a high radial stiffness to prevent axial displacement of the rotatable member relative to the fixed member while maintaining a constant resistance to rotation.

3. The storage device of claim 1, wherein the band creates a high radial stiffness to prevent undesired rotations between the rotatable member and the fixed member.

4. The storage device of claim 1, wherein the first, second, and third leg portions are welded to the rotatable member.

5. The storage device of claim 1, wherein the fixed member and the rotatable member have substantially elliptical-shaped cross-sections.

6. The storage device of claim 1, wherein the band is pre-stressed by loading the band in tension onto the fixed member and in contact with the rotatable member to ensure that the fixed member and the rotatable member remain in contact along the first and second bearing surfaces during rotation of the rotatable member.

7. The storage device of claim 1, wherein the band comprises:
   a central portion coupled to the outer surface;
   a first leg portion extending from the central portion in a first direction that is perpendicular to an axis of the fixed member; and
   at least one second leg portion extending from the central portion in a second direction that is perpendicular to the axis of the fixed member;
   wherein the first leg portion and the at least one second leg portion are connected to the second recessed portion at first and second attachment locations.

8. The storage device of claim 7, wherein the first leg portion is coupled to the second recessed portion at the first location, the central portion is wrapped around the outer surface of the fixed member, and the at least one second leg portion crosses the first leg portion and is coupled to the second recessed portion at the second location.

9. An actuator assembly comprising:
   an actuator body including an opening sized to receive a pivot bearing and adapted to pivot about the pivot bearing;
   an actuator arm coupled to the actuator body and extending from the actuator body; and
   the pivot bearing comprising:
      a fixed member including a first bearing surface comprising a first upper bearing surface and a first lower bearing surface separated by a first recessed portion and including an outer surface;
      a rotatable member including a second bearing surface comprising a second upper bearing surface and a second lower bearing surface separated by a second recessed portion, the second upper and lower bearing surfaces in contact with the first upper and lower bearing surfaces, the rotatable member adapted to pivot about the fixed member; and
      a flexible band that is wrapped around the outer surface of the fixed member, the flexible band including leg portions that cross between the fixed member and the rotatable member and that are fixed to the second recessed portion of the rotatable member adjacent to the second bearing surface to secure the rotatable member at a constant axial distance from the fixed member throughout a range of rotation.

10. The actuator assembly of claim 9, wherein the flexible band comprises a rectangular-shaped band that is fixed to the rotatable member at opposing ends, and wherein the leg portions comprise opposing ends of the rectangular-shaped band.

11. The actuator assembly of claim 9, wherein the flexible band comprises:
   a body portion wrapped around the fixed member;
   a first leg portion extending outwardly from the body portion in a first direction and attached to the rotatable member at a first attachment location within the second recessed portion of the second bearing surface; and
   a second leg portion extending from the body portion in a second direction and attached to the rotatable member at a second attachment location within the second recessed portion of the second bearing surface.

12. The actuator assembly of claim 11, further comprising a third leg portion extending from the body portion in the second direction substantially parallel with the second leg portion, the third leg portion attached to the rotatable member within the second recessed portion at a third attachment location that is adjacent to the second attachment location.

13. The actuator assembly of claim 9, wherein the first bearing surface has a first curvature and wherein the second bearing surface has an opposing curvature, wherein a rotational range of the rotatable member relative to the fixed member is defined by the first curvature and the opposing curvature.

14. The actuator assembly of claim 9, wherein the flexible band is pre-stressed to ensure a constant axial spacing between the fixed member and the rotatable member during operation such that a resistance to rotation of the rotatable member remains substantially constant during operation.

15. The actuator assembly of claim 9, further comprising a voice coil coupled to the actuator body, wherein, in response to a received signal, the voice coil is adapted to apply a rotational torque to the actuator body to rotate the rotatable member about the fixed member to position the actuator arm.

16. A data storage device comprising:
  a storage media comprising one or more rotatable disc platters adapted to store data;
  an actuator assembly adjacent to the storage media, the actuator assembly comprising:
    an actuator body including a bore sized to receive a pivot bearing and adapted to rotate about the pivot bearing;
    an actuator arm extending from the actuator body;
    a flexure arm extending from the actuator arm; and
    one or more read/write heads coupled to the flexure arm and adapted to communicate with the one or more rotatable disc platters;
  the pivot bearing within the bore, the pivot bearing comprising:
    a fixed member including a first bearing surface comprising a first upper bearing surface and a first lower bearing surface and including an outer surface, the first upper and lower bearing surfaces separated by a first groove;
    a rotatable member including a second bearing surface comprising a second upper bearing surface and a second lower bearing surface, the second upper and lower bearing surfaces in contact with the first upper and lower bearing surfaces, the second upper and lower bearing surfaces separated by a second groove, the rotatable member adapted to rotate about the fixed member; and
    a flexible band that is wrapped around the outer surface of the fixed member, the flexible band including at least two leg portions that cross between the fixed member and the rotatable member and that are fixed to the rotatable member within the second groove between the second upper and lower bearing surfaces to secure the rotatable member at a constant axial distance from the fixed member throughout a range of rotation.

17. The storage device of claim 16, wherein the flexible band is adapted to enhance radial stiffness to resist axial displacement between the fixed member and the rotatable member.

18. The storage device of claim 17, wherein the flexible band prevents undesired by the rotatable member relative to the fixed member.

19. The storage device of claim 16, wherein the flexible band comprises:
  a body portion wrapped around the fixed member;
  a first leg portion extending outwardly from the body portion in a first direction and attached to the rotatable member at a first attachment location within the second groove adjacent to the second bearing surface;
  a second leg portion extending from the body portion in a second direction and attached to the rotatable member at a second attachment location within the second groove adjacent to the second bearing surface; and
  a third leg portion extending from the body portion in the second direction substantially parallel with the second leg portion, the third leg portion attached to the rotatable member at a third attachment location within the second groove that is adjacent to the second attachment location.

20. The storage device of claim 19, wherein the first groove is sized to receive at least a portion of the flexible band.

* * * * *

UNITED STATES PATENT AND TRADEMARK OFFICE
CERTIFICATE OF CORRECTION

| | |
|---|---|
| PATENT NO. | : 7,515,385 B1 |
| APPLICATION NO. | : 11/088372 |
| DATED | : April 7, 2009 |
| INVENTOR(S) | : Abrahamson et al. |

Page 1 of 1

It is certified that error appears in the above-identified patent and that said Letters Patent is hereby corrected as shown below:

At column 12, line 19, delete "undesired by the" and insert --undesired rotations by the--

Signed and Sealed this

Fourteenth Day of July, 2009

JOHN DOLL
*Acting Director of the United States Patent and Trademark Office*